(12) United States Patent
Soehner et al.

(10) Patent No.: US 10,821,875 B2
(45) Date of Patent: Nov. 3, 2020

(54) METHOD, COMPRISING CALCULATING A FREQUENCY REPRESENTATION OF AN IMAGE OF A PROJECTION SURFACE, FOR DEPTH PERCEPTION BASED ON VEHICLE HEADLIGHTS ARRANGED ON BOTH SIDES

(71) Applicant: Dr. Ing. h.c. F. Porsche Aktiengesellschaft, Stuttgart (DE)

(72) Inventors: Sebastian Soehner, Karlsruhe (DE); Christian Schneider, Tuebingen (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 16/442,596

(22) Filed: Jun. 17, 2019

(65) Prior Publication Data
US 2020/0010011 A1    Jan. 9, 2020

(30) Foreign Application Priority Data
Jul. 9, 2018    (DE) .................. 10 2018 116 511

(51) Int. Cl.
*B60Q 1/00*    (2006.01)
*B60Q 1/08*    (2006.01)
(Continued)

(52) U.S. Cl.
CPC ............. *B60Q 1/0023* (2013.01); *B60Q 1/08* (2013.01); *G01B 11/026* (2013.01); *G01S 17/48* (2013.01);
(Continued)

(58) Field of Classification Search
CPC .... B60Q 1/0023; B60Q 1/08; B60Q 2300/41; B60Q 2300/42; B60Q 2300/45; G01S 17/48; F21S 41/60
See application file for complete search history.

(56) References Cited

U.S. PATENT DOCUMENTS 8,017,898 B2 *  9/2011  Lu .................. B60Q 1/1423
                                                                  250/208.1
8,081,800 B2 * 12/2011  Irie .................... G06K 9/00362
                                                                  382/100
(Continued)

FOREIGN PATENT DOCUMENTS

DE    102015122172 A1    6/2017
DE    102017117211 B3    9/2018
DE    102018101023 B3    5/2019

*Primary Examiner* — Borna Alaeddini
(74) *Attorney, Agent, or Firm* — Leyig, Voit & Mayer, Ltd.

(57) ABSTRACT

A method for depth perception based on vehicle headlights arranged on both sides of a vehicle includes projecting, by a first vehicle headlight, a first characteristic light pattern onto a projection surface and projecting, by a second vehicle headlight, a second characteristic light pattern. The method also includes capturing an image of the projection surface using an image capturing unit of the vehicle, calculating a frequency representation of the first and second characteristic light patterns in the captured image, and calculating, by evaluating frequency components in the frequency representation of the first and second characteristic light patterns, a coverage coefficient which is correlated with the degree of mutual covering of the first and second characteristic light patterns. The method further includes comparing the coverage coefficient with a coverage threshold value and displacing the first and second characteristic light patterns relative to one another if there is insufficient mutual covering.

11 Claims, 6 Drawing Sheets

(51) Int. Cl.
  *G01B 11/02* (2006.01)
  *G01S 17/48* (2006.01)
  *F21S 41/60* (2018.01)

(52) U.S. Cl.
  CPC ...... *B60Q 2300/41* (2013.01); *B60Q 2300/42* (2013.01); *B60Q 2300/45* (2013.01); *F21S 41/60* (2018.01)

(56) References Cited

U.S. PATENT DOCUMENTS

| | | | |
|---|---|---|---|
| 8,605,947 B2* | 12/2013 | Zhang | G06K 9/00798 |
| | | | 348/116 |
| 9,852,357 B2* | 12/2017 | Zhang | G06K 9/00798 |
| 10,497,147 B2* | 12/2019 | Schneider | G06T 7/593 |
| 10,558,889 B2* | 2/2020 | Soehner | G06K 9/6255 |
| 2007/0176402 A1* | 8/2007 | Irie | B60R 21/01538 |
| | | | 280/735 |
| 2009/0010495 A1* | 1/2009 | Schamp | B60R 21/0134 |
| | | | 382/106 |
| 2010/0189372 A1* | 7/2010 | Chen | G01B 11/25 |
| | | | 382/260 |
| 2010/0299103 A1* | 11/2010 | Yoshikawa | G01B 11/25 |
| | | | 702/167 |
| 2011/0267455 A1* | 11/2011 | Gotz | F21S 41/663 |
| | | | 348/135 |
| 2013/0177202 A1* | 7/2013 | Dierks | G06K 9/3241 |
| | | | 382/103 |
| 2018/0170373 A1* | 6/2018 | Kwon | B60Q 1/085 |
| 2018/0268254 A1* | 9/2018 | Soehner | G06K 9/3233 |
| 2019/0220988 A1 | 7/2019 | Schneider et al. | |

* cited by examiner

METHOD, COMPRISING CALCULATING A FREQUENCY REPRESENTATION OF AN IMAGE OF A PROJECTION SURFACE, FOR DEPTH PERCEPTION BASED ON VEHICLE HEADLIGHTS ARRANGED ON BOTH SIDES

CROSS REFERENCE TO RELATED APPLICATIONS

This application claims benefit to German Patent Application No. DE 10 2018 116 511.0, filed Jul. 9, 2018, which is hereby incorporated by reference herein.

FIELD

The present invention relates to a method for depth perception based on vehicle headlights arranged on both sides, in particular a method for setting sufficient covering between characteristic light patterns which are projected by headlights of a vehicle onto a projection surface. The method described here can preferably be used in particular to set optimum superposition of the light patterns, which can be used for a distance measurement (depth measurement) based on triangulation between the vehicle and the projection surface of the light patterns.

BACKGROUND

Many motor vehicles nowadays have a fixedly mounted driver assistance camera (referred to below as a vehicle camera), which is typically mounted in the upper region of the windshield. The vehicle camera is used in the implementation of various driver assistance systems, for example night light assistance or lane-keep assistance, which are intended to support the driver in specific driving situations. The vehicle camera can be used, inter alia, to implement distance measurement. In this process, referred to as active triangulation, initially a characteristic light pattern that is projected by the headlight of the vehicle is captured by the vehicle camera. The projected light pattern is extracted from the image of the environment that has been captured by the vehicle camera (referred to below as the camera image) using means for image processing, and characteristic structures contained therein are assigned to the units of the headlight producing them. The ascertainment of the correlation between characteristic structures of the light pattern and the units of the headlight producing them corresponds to solving the correspondence problem. Only after this correlation is known is it possible based thereon to ascertain the distance between vehicle and the projected characteristic light pattern using specific triangulation algorithms. The active triangulation, which is initiated with the projection of the characteristic light pattern onto the area in front of the vehicle, is preceded by a calibration of the stereo system of headlight and vehicle camera. Only when the position and orientation of the headlight and of the vehicle camera are known is it possible to use this system for distance ascertainment.

In order to implement active triangulation in the vehicle, a corresponding module chain is necessary which images the above-described processes, starting at the light projection, via image processing, to the final triangulation. In the implementation of the image processing necessary, numerous triangulation algorithms known from the prior art can be used. One of the most frequently used triangulation algorithms is based on what is known as the midpoint method. In this method, the beam progression of the light coming from the headlight (or beam progressions of the light coming from units of the headlight) to a projection surface and the beam progression from the projection surface to the vehicle camera are determined, wherein the latter corresponds to the capturing of the light information by way of the vehicle camera. From the determination of the intersection of the two beams, the distance of the projection surface from the vehicle can be worked out. Due to image processing errors and calibration errors, however, the intersection of these beams frequently does not exist. In order to implement the method so that it is still able to be performed in such cases, the distance (i.e. the shortest link) between the beams is then calculated and declared to be the assumed intersection.

Since the provision of distance data represents a highly safety-relevant process (not just, but in particular, in the field of autonomous driving), the distance data should be made available with the greatest possible accuracy. The accuracy of the distance measurement based on triangulation substantially depends on the baseline, the distance between the triangulation components, wherein a long baseline typically allows for a more accurate triangulation. In the case of a vehicle, this distance between headlight and vehicle camera is approximately 80 cm and cannot be adapted due to the fixed vehicle geometry. Consequently, the resolution of the distance determination by way of active triangulation is primarily limited primarily by this parameter.

SUMMARY

In an embodiment, the present invention provides a method for depth perception based on vehicle headlights arranged on both sides of a vehicle. The method includes projecting, by a first vehicle headlight, a first characteristic light pattern onto a projection surface and projecting, by a second vehicle headlight, a second characteristic light pattern. The method also includes capturing an image of the projection surface using an image capturing unit of the vehicle, calculating a frequency representation of the first and second characteristic light patterns in the captured image, and calculating, by evaluating frequency components in the frequency representation of the first and second characteristic light patterns, a coverage coefficient which is correlated with the degree of mutual covering of the first and second characteristic light patterns. The method further includes comparing the coverage coefficient with a coverage threshold value and displacing the first and second characteristic light patterns relative to one another if the comparing shows that there is insufficient mutual covering between the first and second characteristic light patterns.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Embodiments of the invention make a more accurate distance ascertainment possible, in particular in a motor vehicle.

The method according to the invention is based on the finding that the baseline that is used in the triangulation method can be increased by selecting a different triangulation component. Typically, the triangulation method is based on a headlight-vehicle camera geometry, in which the baseline corresponds to the distance between the headlight and the vehicle camera. As already explained, this distance is relatively short and not variable due to the fixed vehicle geometry. However, if active triangulation is performed on the basis of the light distribution of both vehicle headlights, the baseline can be increased to the distance between the vehicle headlights. In other words, the two vehicle headlights can act as triangulation components, with the vehicle camera being used in a supporting function for beam reconstruction. By applying active triangulation to this headlight-headlight geometry, a higher resolution of the distance thus ascertained can be attained due to the increased baseline. At the same time, this modified triangulation geometry can be used to determine the quality or accuracy of the distance ascertained by way of triangulation in the camera-headlight geometry.

In light of this finding, it is possible using the method according to the invention to adapt or prepare the light emission of the headlights of the vehicle for the performance of the triangulation. In particular, it is possible by way of the method according to the invention to achieve optimum covering between characteristic light patterns which are projected by the headlights of a vehicle onto a projection surface.

In a first step, the method according to the invention comprises projecting in each case one characteristic light pattern onto a projection surface by way of the first and by way of the second headlight of the vehicle preferably in a manner such that the characteristic light patterns at least partially overlap. A partial overlap of the characteristic light patterns is here understood to mean that at least one region of the projection surface is illuminated both by the light of the first headlight and by the light of the second headlight.

In a next step, which can be performed for example continuously parallel to the first step, an image of the projection surface is captured by way of an image capturing unit of the vehicle, for example the vehicle camera. Imaged on that image are the characteristic light patterns of the two headlights, which preferably at least partially cover one another and are subsequently processed by way of an image processing cascade. In order to take the influence of the background into consideration in further calculation steps, the surrounding scene or projection surface can be imaged without the characteristic light patterns before the characteristic light patterns are projected. The characteristic light patterns can also be produced in pulses so as to record the light-pattern-free environment between them.

In a next step, a frequency representation of the characteristic light patterns in the captured image is calculated. To this end, the image that has been captured by the vehicle camera can be subjected to a Fourier transform. The background may be subtracted in order to obtain a frequency spectrum which substantially represents only the characteristic light patterns.

In a next step, a coverage coefficient is calculated, which is correlated with the degree of mutual covering of the two characteristic light patterns, by evaluating the frequency components in the frequency representation of the characteristic light patterns, for example using a predetermined coverage metric. The coverage coefficient indicates the degree of the congruent superposition of the two characteristic light patterns with respect to the characteristic structures contained therein, such as light-dark transitions or corner points of light patterns. If the characteristic light pattern is a chessboard pattern for example, the basic structure of the characteristic pattern is maintained in the case of exact mutual covering, in which dark areas of one characteristic light pattern are superimposed on dark areas of the other characteristic light pattern and light areas of one characteristic light pattern are superimposed on light areas of the other characteristic light pattern. Consequently, the superposition of the two characteristic patterns is then characterized by the same spatial frequencies as the individual characteristic light pattern. However, if the mutual covering is not complete or is insufficient (e.g. lateral and/or vertical offset between respective light and/or dark areas of the characteristic patterns), the light pattern produced by way of the superposition is described by further spatial frequencies. The analysis of the amplitudes of the spatial frequencies of a superposition of the characteristic light patterns thus offers information regarding the congruence. In principle, a coverage coefficient can be determined for each superposition of the two characteristic light patterns.

In a next step, the coverage coefficient is compared to a coverage threshold value. The coverage threshold value can be derived from an optimum (for example substantially hundred percent) mutual covering of the characteristic light patterns, which has been calculated for example per simulation, possibly taking a tolerance into account. The comparison of the coverage coefficient with the coverage threshold value substantially corresponds to the quantification of the distance of the frequency spectrum of the superposition of the characteristic light patterns from the frequency spectrum of the individual characteristic light pattern.

In a final step, the two characteristic light patterns are shifted relative to one another if the comparison shows that there is insufficient mutual covering between the two characteristic light patterns. The shift can be performed iteratively in small steps, wherein the preceding steps are also performed, until a comparison of the coverage coefficient to the coverage threshold value indicates that the degree of mutual covering is sufficient. To make expedient shifting of the characteristic light patterns possible (by way of a corresponding actuation of the headlights), it is possible to calculate or store for example in the corresponding control electronics coverage coefficients relating to different simulated scenarios of an incomplete/insufficient mutual covering of the characteristic light patterns, for example in the form of a coefficient map.

According to further exemplary embodiments of the method, the characteristic light patterns, which have been produced using the first headlight and using the second headlight, can be the same. Each of the characteristic light patterns can preferably be a chessboard light distribution, in which bright/light-filled areas are produced by individual segments of the headlight, for example LEDs of an LED matrix headlight. The characteristic light patterns of the two headlights can substantially be the same and correspond for example to an image of the internal structure of the LED matrix. Alternatively, each of the characteristic light patterns can have a light distribution which has a pattern that varies over time, caused by beating. The beating can be attained by PWM-pulsed (PWM: pulse wave modulation, pulse width modulation) actuation of the headlights in connection with the typical method of "rolling shutter" in camera systems, such as the vehicle camera. The flicker that arises in this way can impart on the light distribution a characteristic pattern and be observed in low-beam and high-beam distribution. The characteristic light pattern can have at least one characteristic structure. The characteristic structures can for example correspond to bright (light-filled) polygonal areas, such as rectangles, within the characteristic light pattern, for example the chessboard pattern. Each characteristic structure can in turn have characteristic features, for example light-dark transitions (edges) or corner points.

In a preferred embodiment of the method, the characteristic light pattern can have a chessboard pattern in which each light-filled segment corresponds to a characteristic structure. In other words, each characteristic structure can be produced by a light-producing unit of the headlight. As a consequence, characteristic features such as corner points or edges of light-filled areas of the characteristic light pattern can be assigned in each case to a segment, such as an LED of the LED matrix headlight.

According to further exemplary embodiments of the method, calculation of a degree of mutual covering between the two characteristic light patterns can include calculating the sum of the amplitudes of the frequency components in the frequency representation of the captured image. The number and magnitude of the amplitudes of the spatial components provide information relating to the distribution and/or structure of edges or corners of the characteristic light pattern. By adding up the amplitudes of the frequency components of the characteristic light pattern which has been produced by superposition, the energy thereof can be determined. Adding up can be effected with weighting, in accordance with a predefined coverage metric. If the two characteristic light patterns are not congruently superposed, frequencies which do not occur in the frequency spectrum of the individual characteristic light pattern are obtained. If the superposition is congruent, a minimum of spatial frequencies is present. In the ideal case, the frequency spectrum of the superposition of the characteristic light patterns corresponds to the frequency spectrum of the individual characteristic light pattern (except for possible fluctuations, due to brightness, in the amplitude magnitudes of the spatial frequencies).

In accordance with further exemplary embodiments of the method, the coverage threshold value can represent an overlap between the two characteristic light patterns, in which characteristic structures of the characteristic light patterns substantially cover one another. In other words, the characteristic structures of the characteristic light patterns are in that case located exactly one above the other. In the case that the coverage coefficient corresponds to the sum of all amplitudes (Fourier coefficient) of the spatial frequencies, the coverage threshold value can correspond to a (local) minimum in the distribution of the coverage coefficients of all possible superpositions of the characteristic light patterns. Consequently, there can be insufficient mutual covering between the two characteristic light patterns if the coverage coefficient is greater than the coverage threshold value.

Once an optimum overlap, that is to say a congruent superposition, between the two characteristic light patterns has been set using the method according to the invention, an image processing cascade can be performed to implement the active triangulation. To this end, at least one characteristic structure of the characteristic light pattern which is arranged in the overlap region of the two characteristic light patterns can be detected in one extended embodiment of the method according to the invention. Only characteristic structures in the overlap region are relevant, because the advantageous modified triangulation with extended baseline can be performed only with respect to such characteristic structures/features. After detection of the at least one structure, the latter and/or the characteristic features thereof can be assigned to the segment producing it of the first and second headlights (for example to a corresponding LED in the LED matrix of the headlight). The step of assigning characteristic structures of the characteristic light pattern to the segments producing them of the headlights is known as the classical correspondence problem and can be solved using methods known from the prior art. The assignment can be effected for example using a trajectory-based feature assignment, which is described in detail in the German patent application DE 10 2018 101 023.0.

In an extended embodiment of the method according to the invention, furthermore at least in each case one triangulation ray for each of the headlights can be calculated. Each triangulation ray is defined by two points: a first point, corresponding to the position of the detected characteristic structure, and a second point, corresponding to the position of the segment, producing said characteristic structure, of the headlight in space. Since the triangulation rays are calculated with respect to characteristic structures in the overlap region of the characteristic light patterns, they have an intersection in the projection plane. Finally, a distance between the vehicle and the projection surface can then be calculated by triangulation using the two calculated triangulation rays and a baseline, which corresponds to the distance between the two headlights of the vehicle. The triangulation is thus effected on the basis of light rays that emerge from the two headlights and produce characteristic structures/features in the overlap light pattern, that is to say intersect in the projection surface. The baseline used here is the distance between the headlights (for example between the positions of the corresponding segments, from which the observed triangulation rays emerge). This baseline in the triangulation system headlight-headlight is significantly longer than the distance between vehicle camera and headlight, which corresponds to the baseline in the triangulation system vehicle camera-headlight that is typically used. For this reason, the distance between the vehicle and the projection surface can be determined with greater accuracy.

According to a further aspect of the present invention, a motor vehicle having a vehicle camera and a light pattern evaluation unit is provided, which is set up to perform the method described herein. The light pattern evaluation unit can represent a separate electronic module and be coupled to the internal vehicle electronics, or it can be implemented by way of a program module in the internal vehicle electronics.

Figure 1:
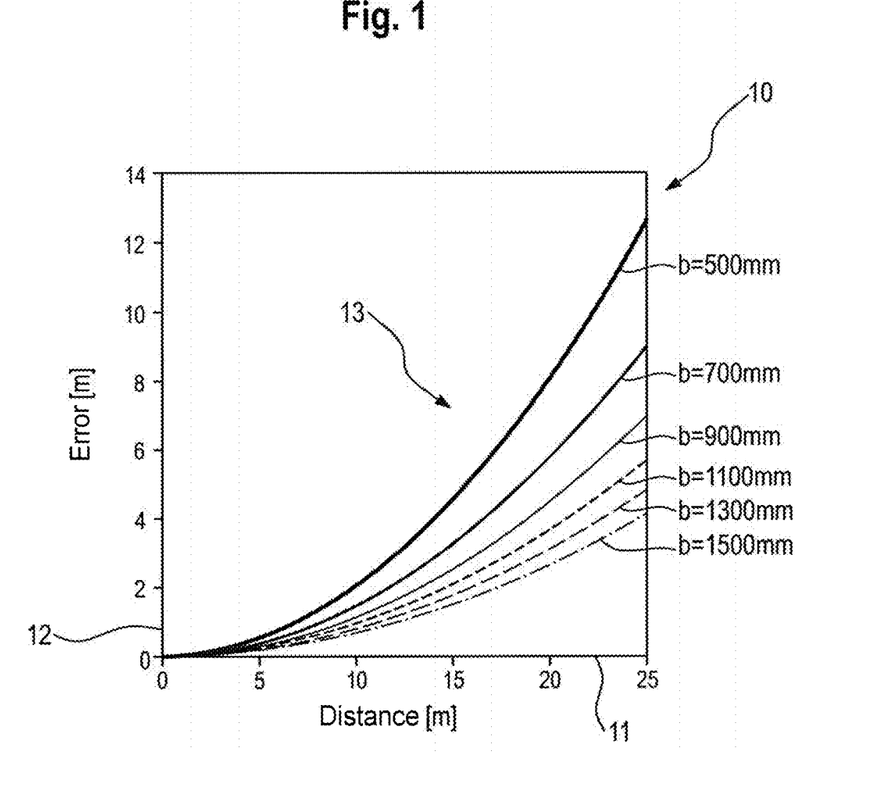
FIG. 1 shows a diagram illustrating a relationship between a baseline, used in the triangulation, and an accuracy of the distance that is able to be ascertained.

The diagram 10 shown in FIG. 1 illustrates the relationship between the attainable accuracy of an ascertained distance value and the distance values themselves as a function of the baseline b. Plotted on the x-axis 11 is the distance between the vehicle and a projection surface of the characteristic light pattern. Plotted on the y-axis 12 is the associated error with which the distance ascertainment is afflicted. The family of curves 13 indicates, for different baselines b, the error with which the ascertained distance is able to be ascertained, which ultimately limits the attainable resolution of the distance ascertainment. The typical implementation of the active triangulation is based on the headlight-camera geometry for reconstructing distance values therefrom. It can be gathered from the diagram 10 that an enlargement of the baseline b is always advantageous and that the effect thereof on the ascertained distance is increasingly positive, the greater said distance is. For example, it can be gathered from the diagram 10 that, at a distance of 15 meters, the distance which is determined for a baseline b=0.7 m with an error of approximately 3.4 meters can be ascertained. By contrast, if the baseline b is, for example, increased to approximately twice its length, b=1.5 m, which can be assumed to be approximately the distance of the headlights in a passenger car, the error reduces by more than 50% to approximately 1.8 meters. It is thus apparent that the enlargement of the baseline b which is associated with the change in geometry from headlight-camera to headlight-headlight makes a significantly more accurate distance ascertainment possible.

The active triangulation on the basis of the characteristic light patterns of both headlights presupposes that the two characteristic patterns cover one another on the projection surface or in the scene that is captured by the vehicle camera at least in partial regions in a manner that is "faithful to shape." The present method makes it possible to quantify an existing superposition of the two characteristic light patterns and to set an optimum superposition (i.e. complete mutual covering in at least one partial region). The quantification of the degree of mutual covering is here based on a correlation between characteristic structures of the characteristic light patterns, for example on the correlation of flicker regions in the frequency domain or of edges or corner points of light fields of the light pattern.

Figure 2A:
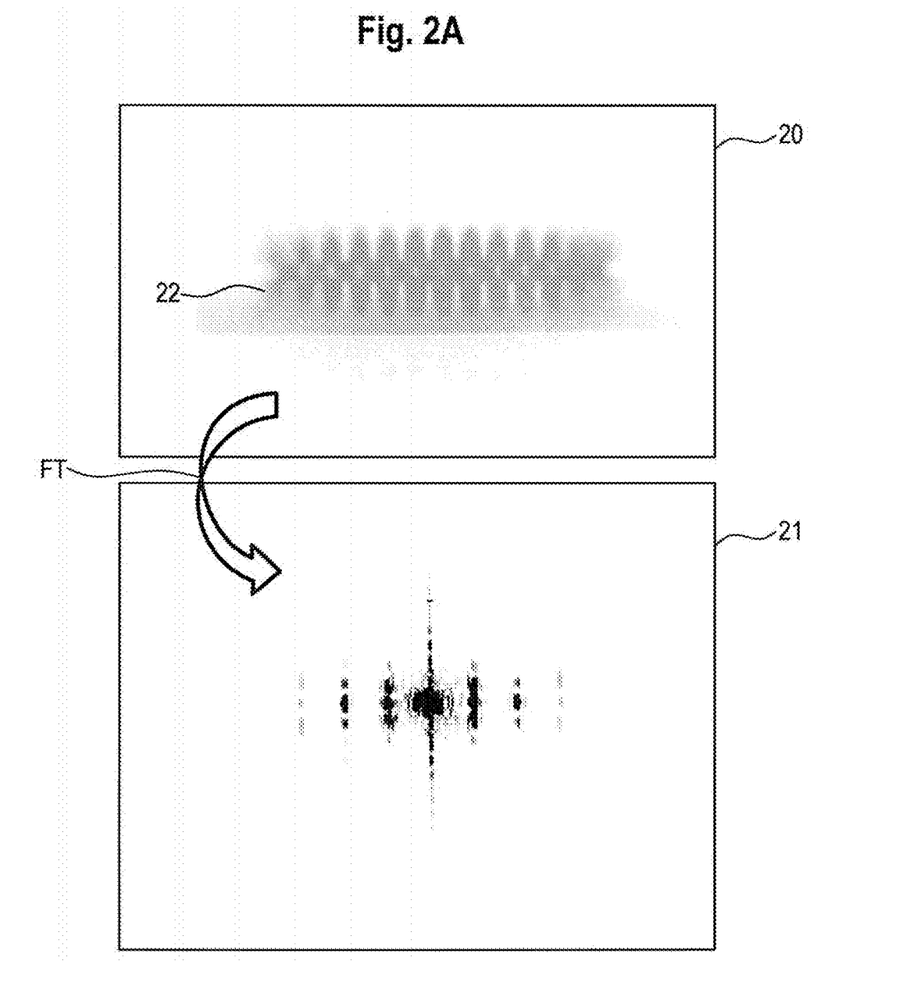
FIG. 2A shows an image of a characteristic light pattern of a headlight (upper portion) and an associated (spatial) frequency representation.

The following text deals with the process of determining the degree of mutual covering. Shown in the upper portion of FIG. 2A is an image 20 of a characteristic light pattern 22 of a headlight. For improved illustration, the image 20 (and also all further representations of the characteristic light pattern in this patent application) corresponds to a negative of an actual recording of a scene using the vehicle camera. That is to say, white regions correspond to dark regions, and dark/gray regions correspond to bright/light-filled regions of the characteristic light pattern 22. The characteristic light pattern 22 substantially has the form of a chessboard pattern, having three rows of light fields, which are arranged one above the other with a pair-wise offset. The lower portion of FIG. 2A shows the associated (spatial) frequency representation of the characteristic light pattern 22, which is obtained by a Fourier transform FT. It is apparent that the periodic chessboard pattern of the characteristic light pattern 22 manifests in an ordered distribution of the spatial frequencies in the frequency representation, which additionally has a distinct symmetry. The amplitude or the coefficient of a frequency component indicates substantially the presence of the brightness variation of corresponding frequency in the real image of the characteristic light pattern.

Figure 2B:
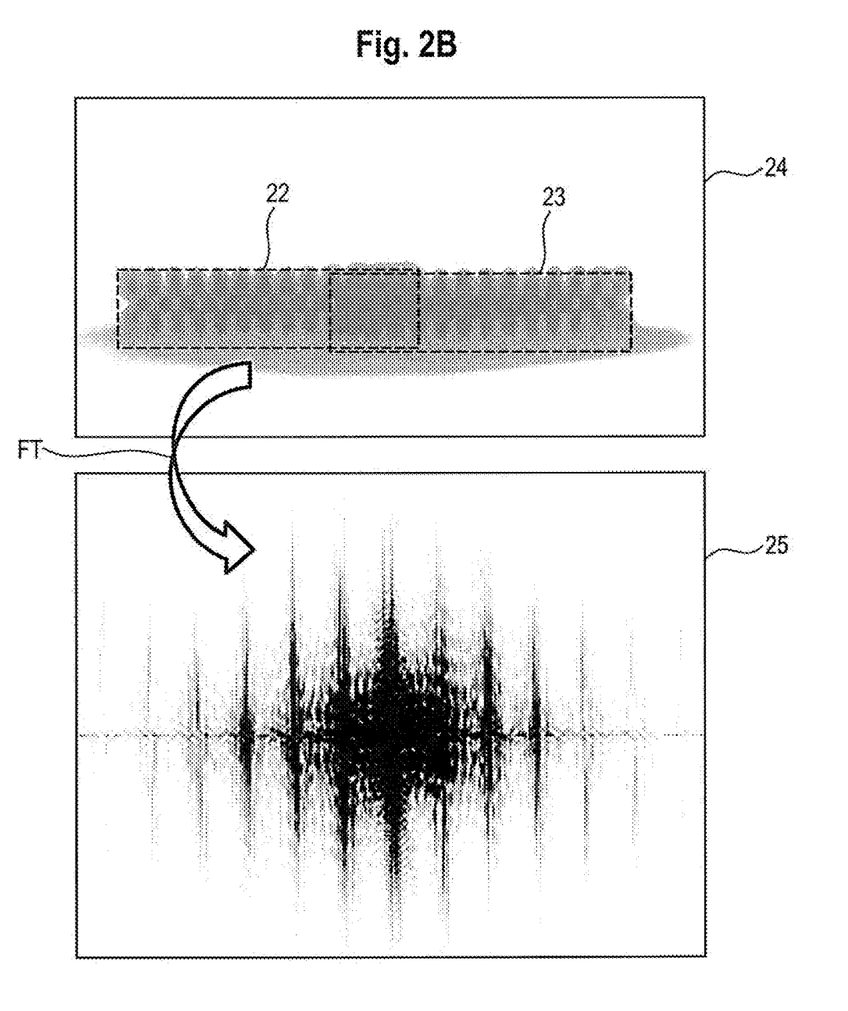
FIG. 2B shows an image of a superposition of two characteristic light patterns (upper portion) and an associated (spatial) frequency representation.
Figures 3A, 3B, 3C:
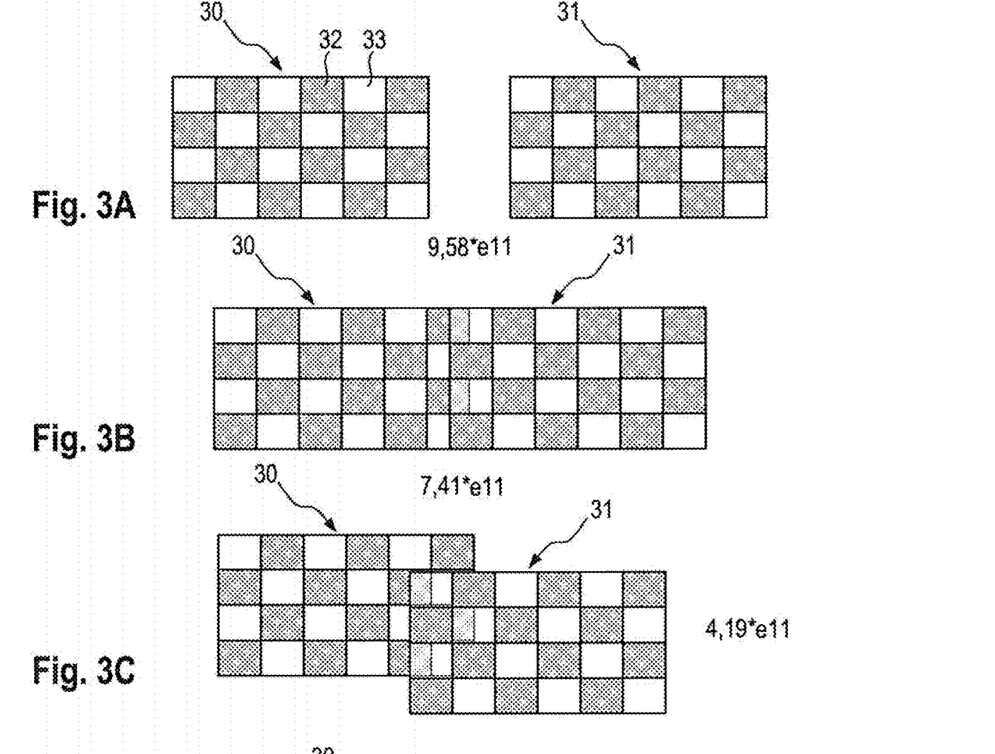
FIGS. 3A-3E show different degrees of superposition of two characteristic light patterns.
Figure 3D:
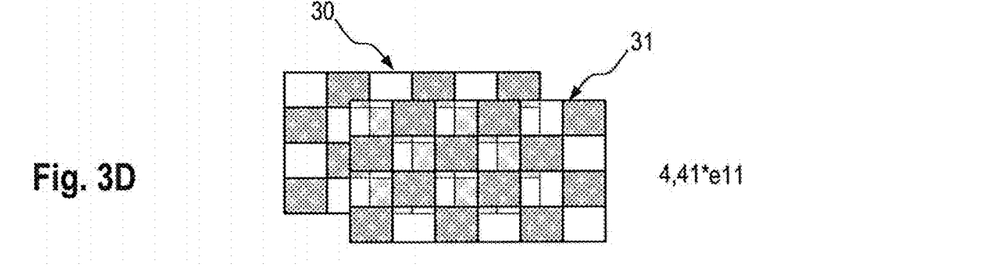
Figure 3E:
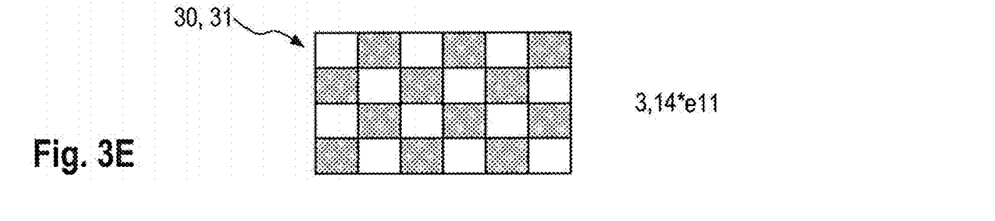

FIG. 2B illustrates, in the upper portion, an image 24 of a superposition of a first characteristic light pattern 22 and of a second characteristic light pattern 23, wherein each of the characteristic light patterns 22, 23 is produced in each case by one of the vehicle headlights. It is apparent that the superposition is not congruent, because the two light patterns 22, 23 have a noticeable vertical offset. The two light patterns 22, 23 are also offset laterally with respect to one another, such that the light-filled fields of the two light patterns 22, 23 are not exactly located one above the other, and consequently a light structure that deviates from the basic structure of the two light patterns 22, 23 is produced in the overlap region of the two light patterns 22, 23. This superposition which is not faithful to shape manifests in the frequency representation 25, which is illustrated in the lower portion of FIG. 2B. As compared to the frequency representation 21 in FIG. 2A, it is apparent that numerous further frequency components are included in the frequency representation 25. It may be said that the frequency spectrum shown in the frequency representation 25 has a higher energy than the frequency spectrum shown in the frequency representation 21 (i.e. significantly more frequency contributions). An offset in the superposition of the characteristic light patterns 22, 23, which does not correspond to the region of the period of the characteristic light pattern, produces a new light pattern with a different basic structure having a different distribution of edges (light-dark transitions). This changed basic structure causes further spatial frequencies, which again increase the energy. In the case of a congruent superposition of the two light patterns 22, 23, in which the basic structure remains substantially unchanged (neglecting a widening of the light areas caused by an increased brightness), the frequency spectrum substantially corresponds to the frequency representation 25 shown in FIG. 2A. It should be pointed out that a congruent superposition means that partial regions of the light patterns 22, 23 are located one above the other in a congruent fashion (covering one another), as is the case for instance in the intersection region of the two dashed rectangles which, at the top of FIG. 2B, indicate the characteristic light patterns 22, 23. It is certainly not necessary, and frequently not practical, that one characteristic light pattern completely covers the other characteristic light pattern.

For each superposition of characteristic light patterns 22, 23, a coverage coefficient can be ascertained which quantifies the degree of mutual covering. As already explained, the coverage coefficient can be formed by (weighted) adding up of the coefficients (amplitudes) of the spatial frequencies in the frequency representation of the superposition of the characteristic light patterns 22, 23. In principle, finding a congruent superposition of light patterns 22, 23 corresponds to finding the superposition that has a frequency representation with minimum energy or minimum coverage coefficient. In periodic characteristic light patterns 22, 23, account should be taken of the fact that there is more than one congruent superposition, and the corresponding coverage coefficients correspond to local minima. The coverage threshold can correspond to a coverage coefficient, which is increased by a tolerance value, of optimum mutual coverage.

FIGS. 3A-3E show the iterative adaptation of the superposition of an idealized first characteristic light pattern 30 and of an idealized second characteristic light pattern 31. Both light patterns 30, 31 have the shape of a chessboard pattern with white areas 33, which are to represent areas without light, and grayish areas 32, which are to represent light-filled/illuminated areas (negative representation analogously to FIGS. 2A and 2B). As part of the method according to the invention, each superposition state shown in FIGS. 3A-3E is transformed to the frequency domain, whereupon the associated coverage coefficient is determined (using a predefined coverage metric). In FIGS. 3A-3E, the coverage coefficients for each superposition are given, which have been ascertained for example by adding up the Fourier coefficients. It is apparent that the coverage coefficient decreases as the degree of mutual covering increases, because increasingly fewer frequency contributions become necessary for describing the light pattern, and subsequently adding-up is performed over fewer amplitudes. A congruent superposition is achieved when the coverage coefficient is minimum. As already mentioned, it is not necessary, contrary to the representation in FIG. 3E, that both light patterns 30, 31 completely cover one another over their entire dimension. It may suffice for example that a congruent superposition, or superposition which is faithful to shape, is present in the region of in each case half of each of the characteristic light patterns 30, 31.

Figure 4:
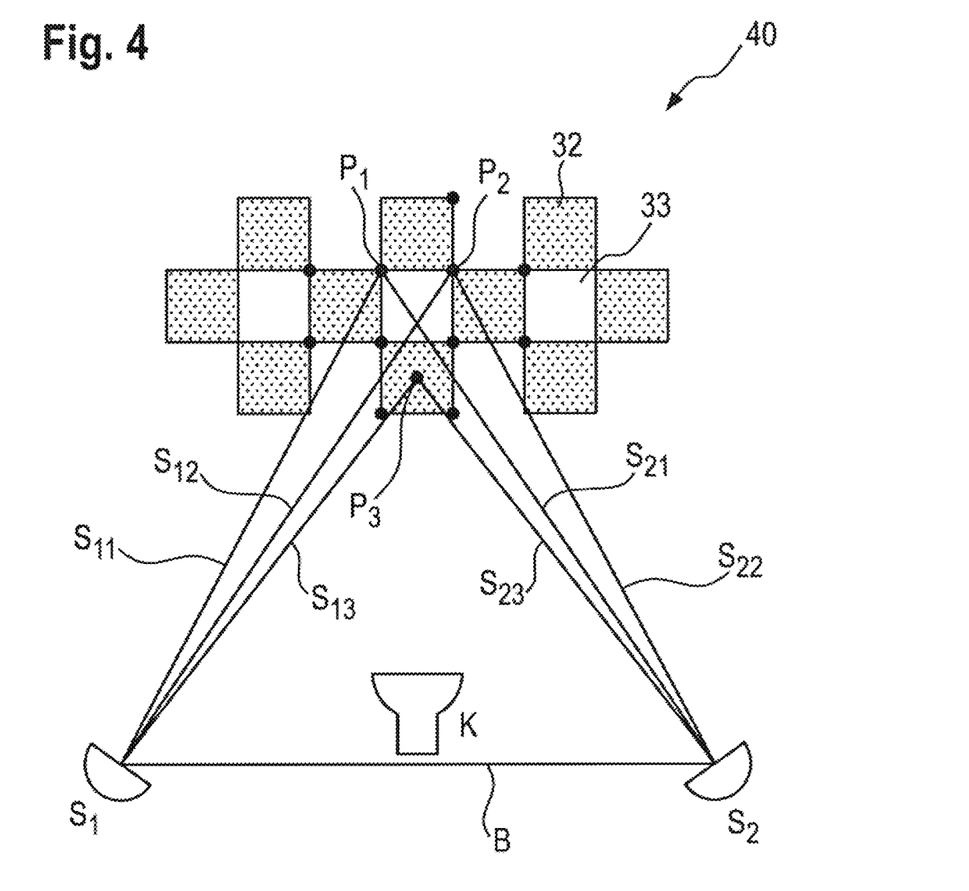
FIG. 4 shows a schematic view of a system for performing active triangulation in accordance with an embodiment of the present invention.

The schematic representation shown in FIG. 4 illustrates the basic structure of the system used to perform the active triangulation. A light pattern 40, which is formed by superposition of two characteristic light patterns of the two headlights S1, S2 is shown here. Illustrated by way of example are a few corner points P1, P2 of the light fields 32, which together with the edges (light-dark transitions) correspond to characteristic features which can in turn be assigned to light fields 32, which correspond to characteristic structures of the light pattern 40. Furthermore illustrated is the vehicle camera K, by means of which the projection surface/scene is captured. In the triangulation system headlight-headlight, the distance between the two headlights S1, S2 corresponds to the baseline B.

By solving the correspondence problem, segments of the two headlights S1, S2 are assigned to characteristic structures or characteristic features which are produced thereby. Consequently, it is possible to reconstruct view rays S11, S12, S13, S21, S22, S23, which connect the characteristic structures or characteristic features to the associated segments of the headlights S1, S2. The base points for the calculation of these view rays are known because the system of vehicle camera K and headlight S1, S2 is calibrated, that is to say the positions of the components relative to one another are known. The view rays can be defined preferably with respect to corner points P1, P2, as is the case for the view rays S11, S12 and S21, S22, which connect segments of the first and second headlight S1, S2 to the corner points P1 and P2, respectively, of the characteristic light. The view rays can likewise be defined with respect to a center point P3 of a characteristic structure, as is the case for the view rays S13 and S23. For the modified triangulation on the basis of the headlight-headlight geometry, view rays are at any rate necessary which have common intersections in the projection surface—in FIG. 4, this is the case, pairwise, in the corresponding view rays S11 and S21, S12 and S22, and S13 and S23. The view rays S11, S12, S13, S21, S22, S23 can be projected into the scene, that is to say into the image of the scene recorded by the vehicle camera K, wherein they are then referred to as triangulation rays. From the calculation of the intersection of in each case two corresponding triangulation rays, the distance value between vehicle and projection surface is ultimately ascertained as the final target variable.

By using a baseline B corresponding to the distance between the two headlights S1, S2, it is possible, as compared to the triangulation with a baseline that corresponds to the distance between the vehicle camera K and headlight S1, S2, to improve the spatial resolution of the distance measurement.

Figure 5:
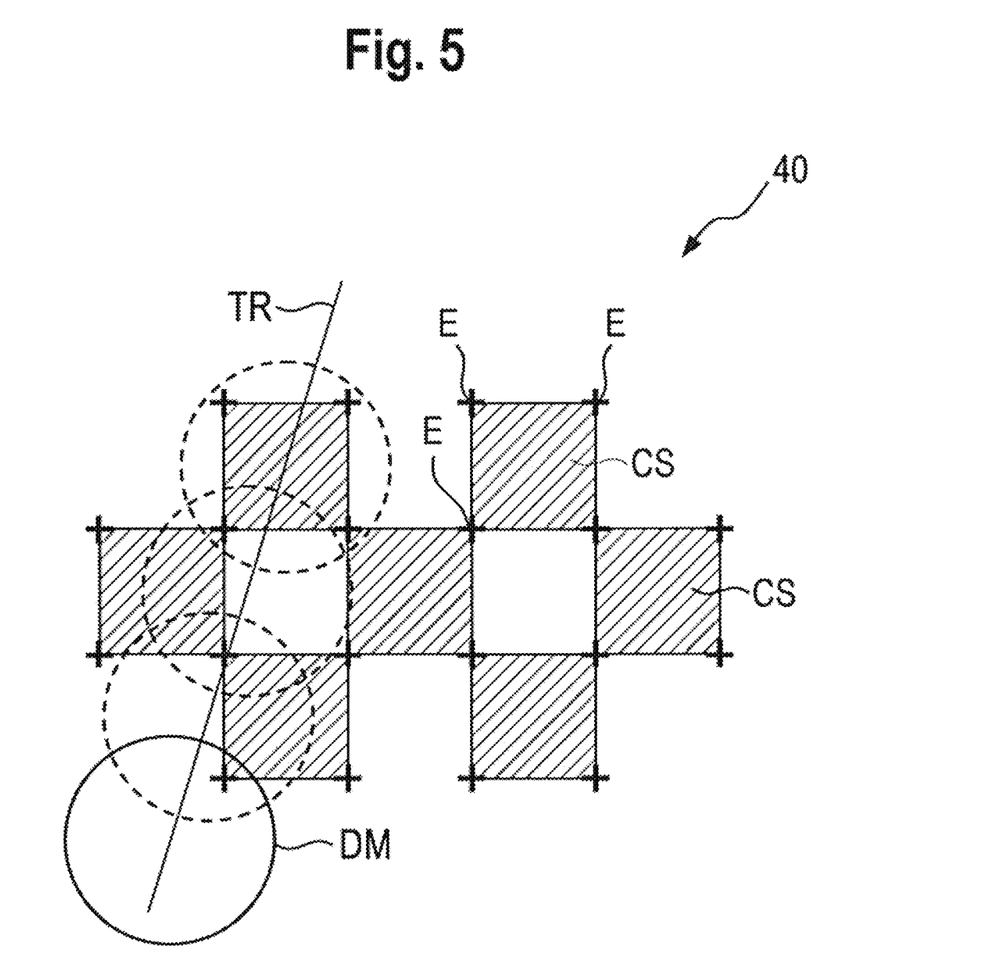
FIG. 5 illustrates a method for finding an assignment between characteristic features of the characteristic light pattern and the segments producing them of the headlight.

Starting from FIG. 5, finally a method shall be outlined that can be used to determine an assignment between characteristic features of the characteristic light pattern 40 and the segments producing them of the headlight. By way of example, the features used should here be corner points E of light areas 32 of the characteristic light pattern 40. The method is described in detail in the German patent application DE 10 2018 101 023.0.

First, an edge detection can be applied to the image of the characteristic light pattern 40 captured by the vehicle camera. Endpoints of the detected edges can be declared to be corner points E of the light fields CS. FIG. 5 furthermore illustrate a trajectory TR. The latter corresponds to a beam path projected into the reference system of the vehicle camera and consequently into the camera image, said path describing the path of an associated light field CS in the image plane of the vehicle camera K which is obtained when the distance between vehicle and projection surface is varied. This beam path can be calculated in the calibrated stereo system of headlight and camera and consequently based on the calibration data of the camera and of the headlight.

Next, a detection mask DM is determined, which is displaced along the trajectory TR (illustrated in FIG. 2 by way of dashed, upwardly migrating circles) to find the characteristic structure that is associated with the trajectory TR, in this case the associated light field CS. In other words, the characteristic structure produced by the unit of the headlight that is associated with the trajectory TR is to be ascertained. In each position of the detection mask DM, first corner points E of the chessboard pattern are detected as characteristic features. It should be noted that at the stage of the method illustrated in FIG. 2 it is not clear which corner points E belong to which characteristic structure CS. After the detection of the corner points E along the trajectory TR, those among them which together define a characteristic structure CS are ascertained. This ascertainment is based on the assumption that in the image captured by the camera exactly one characteristic structure CS exists that belongs to a respective trajectory TR of a headlight segment. All other characteristic structures have slightly offset trajectories. In other words, it is determined which corner points E detected in the local environment of the trajectory TR define an associated characteristic structure CS.

With suitable constraints in the definition of the detection mask DM, it is possible to ensure that, in the illustrated exemplary scenario, four appropriate characteristic features, that is to say four appropriate corner points E of a characteristic structure CS, are detected: an upper right corner, an upper left corner, a bottom right corner and a bottom left corner E of a characteristic structure CS. It is in particular possible to ensure in this way that the search algorithm detects characteristic structures CS and not the dark fields located between them. FIG. 5 shows that the upper left light field of the characteristic light pattern 40 is detected as the characteristic structure associated with the trajectory TR shown, because only at this position of the detection mask DM are four appropriate corner points E present within the detection mask. It should be understood that the described assignment can be effected by way of corresponding trajectories also with respect to the other characteristic structures. In general, further assignment approaches can also be used, for example based on Euclidean minimization methods.

At the end of the method shown in FIG. 5, the light fields as characteristic structures are correlated with the segments producing them of the headlight. Consequently, the view rays mentioned in FIG. 4 can be calculated on said basis.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for depth perception based on vehicle headlights arranged on both sides of a vehicle, the method comprising:
   projecting, by a first vehicle headlight, a first characteristic light pattern onto a projection surface and projecting, by a second vehicle headlight, a second characteristic light pattern onto the projection surface;
   capturing an image of the projection surface using an image capturing unit of the vehicle;
   calculating a frequency representation of the first and second characteristic light patterns in the captured image;
   calculating, by evaluating frequency components in the frequency representation of the first and second characteristic light patterns, a coverage coefficient which is correlated with a degree of mutual covering of the first and second characteristic light patterns;
   comparing the coverage coefficient with a coverage threshold value; and
   displacing the first and second characteristic light patterns relative to one another if the comparing the coverage coefficient with the coverage threshold value shows that there is insufficient mutual covering between the first and second characteristic light patterns.

2. The method as claimed in claim 1, wherein the first and second characteristic light patterns are the same light pattern.

3. The method as claimed in claim 1, wherein the first and second characteristic light patterns have a chessboard pattern in which each light-filled segment corresponds to a characteristic structure.

4. The method as claimed in claim 1, wherein the first and second characteristic light patterns are formed by pulse-width modulated actuation of the first and second vehicle headlights.

5. The method as claimed in claim 1, wherein the calculating the coverage coefficient includes calculating a sum of amplitudes of the frequency components in the frequency representation of the first and second characteristic light patterns in the captured image.

6. The method as claimed in claim 1, wherein the coverage threshold value represents an overlap of the first and second characteristic light patterns, in which characteristic structures of the characteristic light patterns substantially cover one another.

7. The method as claimed in claim 1, wherein there is insufficient mutual covering between the first and second characteristic light patterns if the coverage coefficient is greater than the coverage threshold value.

8. The method as claimed in claim 1, further comprising:
   detecting at least one characteristic structure arranged in an overlap region of the first and second characteristic light patterns; and
   assigning the detected characteristic structure to a first segment of the first headlight and to a second segment of the second headlight, wherein the first segment of the first headlight produces the overlap region of the first characteristic light pattern and the second segment of the second headlight produces the overlap region of the second characteristic light pattern.

9. The method as claimed in claim 8, further comprising:
   calculating one respective triangulation ray for each of the first and second headlights, wherein each respective triangulation ray is defined by a first point, which corresponds to a position of the detected characteristic structure in a space, and a second point, which corresponds to a position of one of the first segment of the first headlight or the second segment of the second headlight; and
   calculating a distance between the vehicle and the projection surface by triangulation using the two calculated triangulation rays and a baseline that corresponds to the distance between the two headlights of the vehicle.

10. The method as claimed in claim 1, wherein the projecting, by the first vehicle headlight, the first characteristic light pattern onto the projection surface and the projecting, by the second vehicle headlight, the second characteristic light pattern is performed such that the first and second characteristic light patterns overlap one another at least partially.

11. A motor vehicle comprising:
   a vehicle camera configured to capture an image of a projection surface onto which a first characteristic light pattern is projected by a first vehicle headlight and onto which a second characteristic light pattern is projected by a second vehicle headlight; and
   a light pattern evaluator configured to:
      calculate a frequency representation of the first and second characteristic light patterns in the captured image;
      calculate, by evaluating frequency components in the frequency representation of the first and second characteristic light patterns, a coverage coefficient which is correlated with the degree of mutual covering of the first and second characteristic light patterns;
      compare the coverage coefficient with a coverage threshold value, and
      displace the first and second characteristic light patterns relative to one another if the comparing the coverage coefficient with the coverage threshold value shows that there is insufficient mutual covering between the first and second characteristic light patterns.

* * * * *